(12) United States Patent
Johnson et al.

(10) Patent No.: US 12,668,364 B2
(45) Date of Patent: Jun. 30, 2026

(54) LINEARLY DRIVEN ROTARY ACTUATOR MECHANISM

(71) Applicant: B/E Aerospace, Inc., Winston-Salem, NC (US)

(72) Inventors: John Johnson, Tobaccoville, NC (US); Evan Duggins, King, NC (US)

(73) Assignee: B/E Aerospace, Inc., Winston-Salem, NC (US)

( * ) Notice: Subject to any disclaimer, the term of this patent is extended or adjusted under 35 U.S.C. 154(b) by 147 days.

(21) Appl. No.: 18/624,626

(22) Filed: Apr. 2, 2024

(65) Prior Publication Data

US 2025/0304259 A1 Oct. 2, 2025

(51) Int. Cl.
*B64D 11/06* (2006.01)
*A47B 5/04* (2006.01)
*F16C 11/04* (2006.01)

(52) U.S. Cl.
CPC ............ *B64D 11/0638* (2014.12); *A47B 5/04* (2013.01); *F16C 11/04* (2013.01); *A47B 2220/0069* (2013.01)

(58) Field of Classification Search
CPC ..... E05F 1/1246; E05F 1/1269; E05F 1/1276; B64D 11/0638; A47B 2220/0069; A47B 5/04; F16C 11/04
See application file for complete search history.

(56) References Cited

U.S. PATENT DOCUMENTS

| | | | |
|---|---|---|---|
| 2,822,568 A | 2/1958 | Hosea | |
| 3,036,350 A | 5/1962 | Hunt | |
| 3,906,587 A | 9/1975 | Little | |
| 4,331,041 A | 5/1982 | Bennett | |
| 5,178,034 A | 1/1993 | Reasoner | |
| 2005/0023843 A1* | 2/2005 | Bartmann ............. | F24C 15/024 |
| | | | 292/303 |
| 2008/0257099 A1 | 10/2008 | Prat Terrades et al. | |
| 2011/0286689 A1* | 11/2011 | Liang ................... | A47B 88/463 |
| | | | 384/10 |
| 2018/0354398 A1* | 12/2018 | Lamb ................... | F16M 11/041 |

FOREIGN PATENT DOCUMENTS

| | | | | |
|---|---|---|---|---|
| CN | 114016839 A | * | 2/2022 | ............... E05D 3/18 |
| WO | WO-2016095990 A1 | * | 6/2016 | ........... E05F 1/1276 |

* cited by examiner

*Primary Examiner* — Matthew W Ing
(74) *Attorney, Agent, or Firm* — Suiter Swantz IP

(57) ABSTRACT

An actuator mechanism includes a base mountable to a first component, and a spindle rotatably mounted to the base and attachable to a second component rotatable relative to the first component. At least one extension spring is disposed in the base. A cable has a first end attached to the spindle and a second end attached to the at least one extension spring. A spring tensioner is movably mounted to the base. In use, the spring tensioner is operable to preload the mechanism, rotating the spindle in a first direction winds the cable and stretches the at least one extension spring, and rotating the spindle in a second direction unwinds the cable and relaxes the at least one extension spring. In embodiments, the mechanism may be utilized to reduce weight force and provide lift assistance to rotating components.

20 Claims, 9 Drawing Sheets

LINEARLY DRIVEN ROTARY ACTUATOR MECHANISM

TECHNICAL FIELD AND BACKGROUND

The present disclosure relates generally to a motion control mechanism, and more particularly, to a linearly driven rotary actuator mechanism for controlling component motion such as rotation.

In various applications, certain components are movable relative to others. In aircraft, for example, interior components such as meal tables, doors, sliding panels, etc., may be movably attached to fixed support components. In some instances, movable components may be rotatably attached to fixed components.

Hinges, latches, dampers, etc., associated with movable components bear the weight of the movable component and in some cases incorporate active elements at the hinge axis for reducing the weight/force realized to create a lighter and more desirable feel. For example, meal tables configured to rotate between a stowed position and a deployed position may incorporate one or more torsion springs at the hinge axis. While suitable in some applications, packaging constraints and heavy component weights may preclude the use of active elements at the hinge axis. In addition, active elements located at the hinge axis are typically incapable of being adjusted, and are subject to wear and tear and consequential failure.

Accordingly, what is needed is a motion controller compatible for use with various types of movable components, and which is configured as a stand-alone device locatable apart from the hinge axis and capable of being tuned.

BRIEF SUMMARY

According to one aspect, the inventive concepts according to the present disclosure are directed to a linearly driven rotary actuator mechanism including a base mountable to a first component, a spindle rotatably mounted to the base and attachable to a second component rotatable relative to the first component, at least one extension spring disposed in the base, a cable having a first end attached to the spindle and a second end attached to the at least one extension spring, and a spring tensioner movably mounted to the base and attached to the at least one extension spring. In use, the spring tensioner is movable relative to the base to tension the at least one extension spring, rotation of the spindle in a first direction winds the cable on the spindle thereby stretching the at least one extension spring, and rotation of the spindle in a second direction opposite the first direction unwinds the cable from the spindle thereby relaxing the at least one extension spring.

In some embodiments, the mechanism further includes two extensions springs arranged in parallel, and a yoke attached to the two extension springs, wherein the second end of the cable is attached to the yoke and the spring tensioner is attached to each of the two extension springs.

In some embodiments, the base includes a first portion and a second portion angled relative to the first portion, the at least one spring is disposed in the first portion and the spindle is rotatably mounted to the second portion, the actuator mechanism further includes a pulley rotatably mounted at a junction of the first portion and the second portion, and the cable is routed around the pulley to impart a direction change in the cable at the junction.

In some embodiments, the mechanism further includes a tensioner adjustment screw received through one end of the base and threadably engaged in the spring tensioner.

In some embodiments, one end of the base is bifurcated, and the spindle is rotatably mounted transverse at the bifurcated end.

In some embodiments, the bifurcated end includes a detachable portion for installing and uninstalling the spindle from the bifurcated end.

In some embodiments, opposing ends of the spindle each include a laterally-extending tab for being engaged in a slot formed in the second component to rotationally fix the spindle relative to the second component.

In some embodiments, the spindle includes a radial opening receiving the first end of the cable, and the spindle defines a circumscribing cable groove in a plane transverse to its rotational axis.

In some embodiments, the at least one spring provides a spring force in a first direction, and a rotational axis of the spindle is transverse to the first direction.

According to another aspect, the inventive concepts according to the present disclosure are directed to an assembly Including a first component and a second component rotatably hinged to the first component. The assembly further includes an actuator mechanism for controlling rotation of the second component relative to the first component. In embodiments, the actuator mechanism includes a base mounted to the first component, a spindle rotatably mounted to the base and attached to and rotatably fixed relative to the second component, at least one extension spring disposed in the base, a cable having a first end attached to the spindle and a second end attached to the at least one extension spring, and a spring tensioner movably mounted to the base and attached to the at least one extension spring. In use, the spring tensioner is movable relative to the base to tension the at least one extension spring, rotating the second component relative to the first component in a first direction winds the cable on the spindle thereby stretching the at least one extension spring, and rotating the second component relative to the first components in a second direction opposite the first direction unwinds the cable from the spindle thereby relaxing the at least one extension spring.

In some embodiments, the second component is rotatable relative to the first component between a stowed position and a deployed position, the actuator mechanism operates to slow motion of the second component as the second component moves from the stowed position to the deployed position, and the actuator mechanism provides lift assistance for returning the second component from the deployed position to the stowed position.

In some embodiments, the first component is a meal table base and the second component is a meal table.

In some embodiments, the at least one spring provides a spring force in a first direction, and a rotational axis of the spindle is transverse to the first direction.

According to further aspect, the inventive concepts according to the present disclosure are directed to a linearly driven rotary actuator mechanism. In embodiments, the mechanism includes a base, a spindle rotatably mounted to the base, at least one extension spring, a cable having a first end attached to the spindle and a second end attached to the at least one extension spring, and a pulley rotatably mounted to the base and imparting a direction change in the cable. In use, rotating the spindle in a first direction winds the cable on the spindle and stretches the at least one extension spring, and rotating the spindle in a second direction opposite the first direction unwinds the cable from the spindle and relaxes the at least one extension spring.

In some embodiments, the mechanism is configured for use to control rotation of a first component relative to a second component, wherein the base is mounted to the second component, the spindle is rotationally fixed to the first component, and the spindle is positioned coaxial with a rotational axis of the first component.

This summary is provided solely as an introduction to subject matter that is fully described in the following detailed description and drawing figures. This summary should not be considered to describe essential features nor be used to determine the scope of the claims. Moreover, it is to be understood that both the foregoing summary and the following detailed description are explanatory only and are not necessarily restrictive of the subject matter claimed.

BRIEF DESCRIPTION OF THE DRAWINGS

Implementations of the inventive concepts disclosed herein may be better understood when consideration is given to the following detailed description thereof. Such description refers to the included drawings, which are not necessarily to scale, and in which some features may be exaggerated and some features may be omitted or may be represented schematically in the interest of clarity. Like reference numerals in the drawings may represent and refer to the same or similar element, feature, or function. In the drawings.

DETAILED DESCRIPTION

Figure 1:
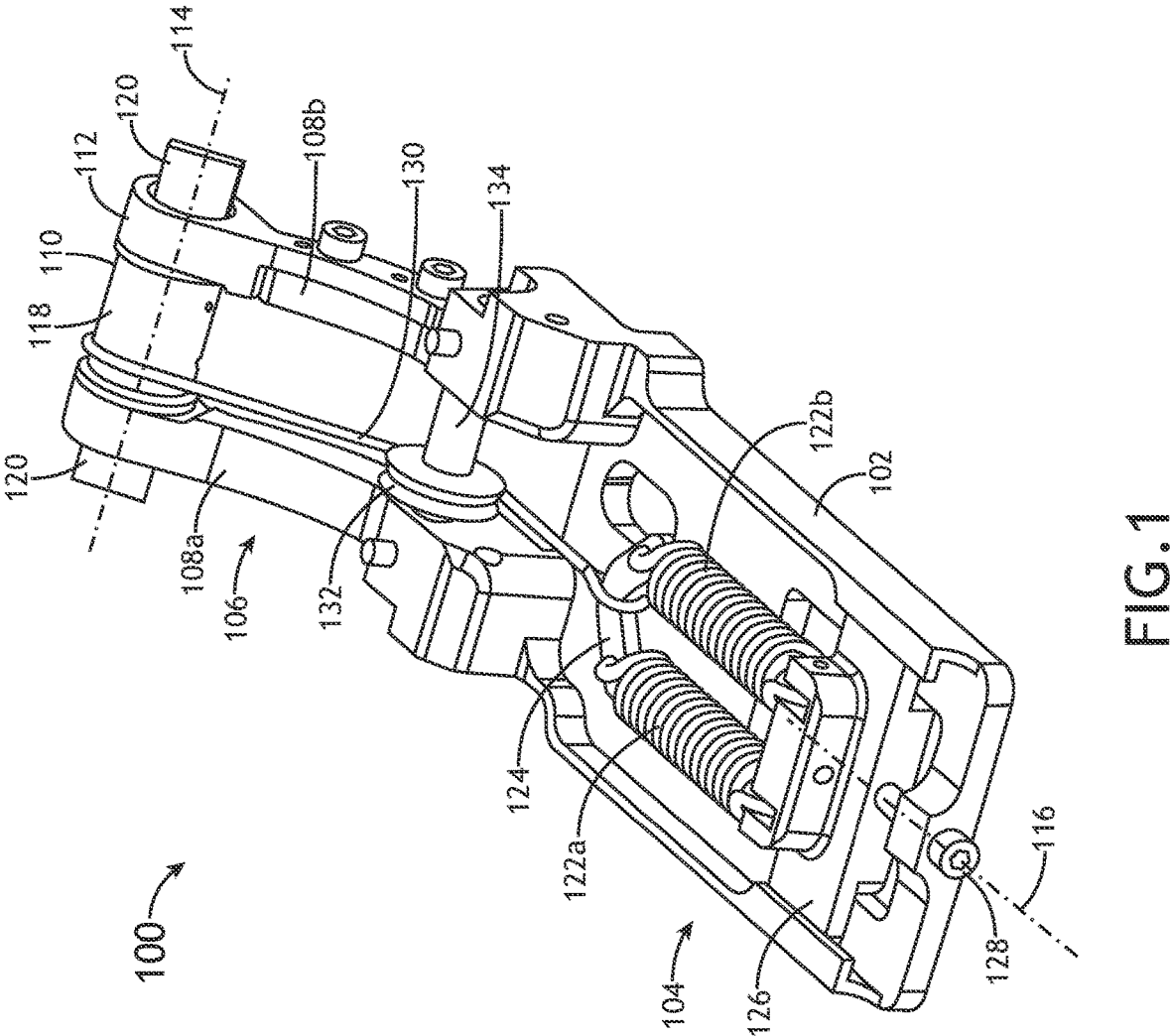
FIG. 1 is an isometric view of a linearly driven rotary actuator mechanism, in accordance with example embodiments of this disclosure.

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. In the following detailed description of embodiments of the instant inventive concepts, numerous specific details are set forth in order to provide a more thorough understanding of the inventive concepts. However, it will be apparent to one of ordinary skill in the art having the benefit of the instant disclosure that the inventive concepts disclosed herein may be practiced without these specific details. In other instances, well-known features may not be described in detail to avoid unnecessarily complicating the instant disclosure. The inventive concepts disclosed herein are capable of other embodiments or of being practiced or carried out in various ways. Also, it is to be understood that the phraseology and terminology employed herein is for the purpose of description and should not be regarded as limiting.

As used herein, a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only, and should not be construed to limit the inventive concepts disclosed herein in any way unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of embodiments of the instant inventive concepts. This is done merely for convenience and to give a general sense of the inventive concepts, and "a" and "an" are intended to include one or at least one and the singular also includes the plural unless it is obvious that it is meant otherwise.

Finally, as used herein any reference to "one embodiment" or "some embodiments" means that a particular element, feature, structure, or characteristic described in connection with the embodiment is included in at least one embodiment of the inventive concepts disclosed herein. The appearances of the phrase "in some embodiments" in various places in the specification are not necessarily all referring to the same embodiment, and embodiments of the inventive concepts disclosed may include one or more of the features expressly described or inherently present herein, or any combination of sub-combination of two or more such features, along with any other features which may not necessarily be expressly described or inherently present in the instant disclosure.

Broadly, embodiments of the inventive concepts disclosed herein are directed to a motion control mechanism that uses linear spring force to control rotary motion. In embodiments, the motion control mechanism is a stand-alone mechanism configured to be assembled, preloaded, and the assist force calibrated apart from an assembly in which the mechanism is utilized. For assemblies with little available internal space and/or where it is impractical or undesirable to using an active element (e.g., torsion spring) at the hinge axis, the motion control mechanism can be located at the periphery of the assembly components requiring motion control. In use, the motion control mechanism reduces the weight/force realized by the weight bearing components (e.g., hinge, latch, stops, damper) thereby reducing wear and tear while creating a lighter and more desirable feel. In embodiments, the motion control mechanism facilitates the use of heavier, more substantial, and better equipped movable components to accommodate passenger expectations.

Benefits of the motion control mechanism include, but are not limited to, use to control motion where rotary actuators are precluded due to space and other restrictions, installation flexibility to position the mechanism coaxially or offset from the rotational axis of an assembly, the ability to change the mechanical advantage to suit the particular application, the ability to adjust preload for varied applications, the ability to change the spindle form-factor and/or the axis location to vary the force and behavior of the applied force, utilization of available free space when part crowding or form-factor precludes use of traditional methods of motion control, reduces wear and tear on weight bearing components, improves the 'feel' when utilizing relatively heavy, larger and more feature rich accessories.

The term 'linearly driven rotary actuator mechanism' is used interchangeably herein with the terms 'motion control mechanism, "actuator mechanism,' and more simply 'mechanism.' The actuator mechanism according to the present disclosure can be used as a rotary motion controller for assemblies such as aircraft interior assemblies. In a particular conceived example of this disclosure, the actuator mechanism is used in the context of a meal table assembly to control rotation of a meal table relative to a meal table support. Under manual control, for example by a passenger, the actuator mechanism operates to slow the rotation of the meal table during deployment, and provide lift assistance for the meal table during stowing.

Referring to FIG. 1, a non-limiting example of a linearly driven rotary actuator mechanism is shown generally at reference numeral 100. The actuator mechanism 100 generally includes a base 102 configured to be mounted to a first component, for instance a fixed component to which a second component is rotatable attached. As shown, the base 102 includes a first portion 104 and a second portion 106 that are integrally formed. The second portion 106 may be angled relative to the first portion 104. In embodiments, the first portion 104 may be substantially planar and the second portion 106 may be bifurcated to form two separate arms 108*a*, 108*b*.

A spindle 110 is rotatably mounted to the base 102. In embodiments, the spindle 110 is rotatably mounted to the ends of the arms 108*a*, 108*b* to position the rotating spindle 110 at one extreme end of the base 102. A part 112 of one of the arms 108*a*, 108*b* may be removably attachable to facilitate installation and removal of the spindle 110. As shown, a rotational axis 114 of the spindle 110 is transverse to a longitudinal axis 116 of the base, and also substantially perpendicular to a linear spring force as discussed in detail below. In embodiments, the spindle 110 includes a cable drum 118 disposed between the two arms 108*a*, 108*b*, and spindle tabs 120 formed on each of the opposing ends of the spindle 110 for engaging with features of the second component to rotationally fix the spindle 110 to the second component.

At least one extension spring is disposed in the base 102, for instance positioned relative to the first portion 104. In embodiments, two extension springs 122*a*, 122*b* are arranged in parallel. One end of each extension spring 122*a*, 122*b* is attached to a yoke 124, and the opposing end of each extension spring 122*a*, 122*b* is attached to a spring tensioner 126. The spring tensioner 126 is movably mounted to the base 102, for instance slidable relative to the base, to move toward and away from the extension springs 122*a*, 122*b* to stretch or relax the extension springs 122*a*, 122*b* to adjust the spring force. A tensioner adjustment screw 128 is received through one end of the base 102 and threadably engages in the spring tensioner 126. In use, the tensioner adjustment screw 128 is turned, by a tool, to advance the tensioner adjustment screw 128 into the spring tensioner 126 to draw the spring tensioner 126 closer to stretch the extension springs 122*a*, 122*b*, or withdraw the tensioner adjustment screw 128 from the spring tensioner 126 to move the spring tensioner 126 away to relax the extension springs 122*a*, 122*b*. Other spring tensioner configurations may be utilized.

A cable 130 extends between the extension springs 122, 122*b* and the spindle 110 for transferring linear motion from the extension springs 122*a*, 122*b* into rotational motion of the spindle 110. As shown, a first end of the cable 130 is attached to the spindle 110 and a second end of the cable 130 is attached to the yoke 124, when a two extension spring configuration is utilized with a yoke 124. In some configurations, a single extension spring may be utilized without a yoke.

In embodiments in which the linear spring axis and the spindle axis are positioned in different planes, a pulley 132 may be utilized to impart a direction change in the cable 130. As shown, the pulley 132 may be rotatably mounted on a transverse axle 134 mounted between the two arms 108*a*, 108*b*. The transverse axle 134 may be positioned at the junction between the first and second portions 104, 106 where the direction change occurs. The cable 130 is routed around the pulley 132 to change the cable direction. In some embodiments, more than one pulley may be utilized where at least two cable direction changes are needed. In addition to direction changes, an additional pulley may also be utilized to reduce the required pull force at the adjuster mechanism with modification to cable routing and termination points.

Figure 2A:
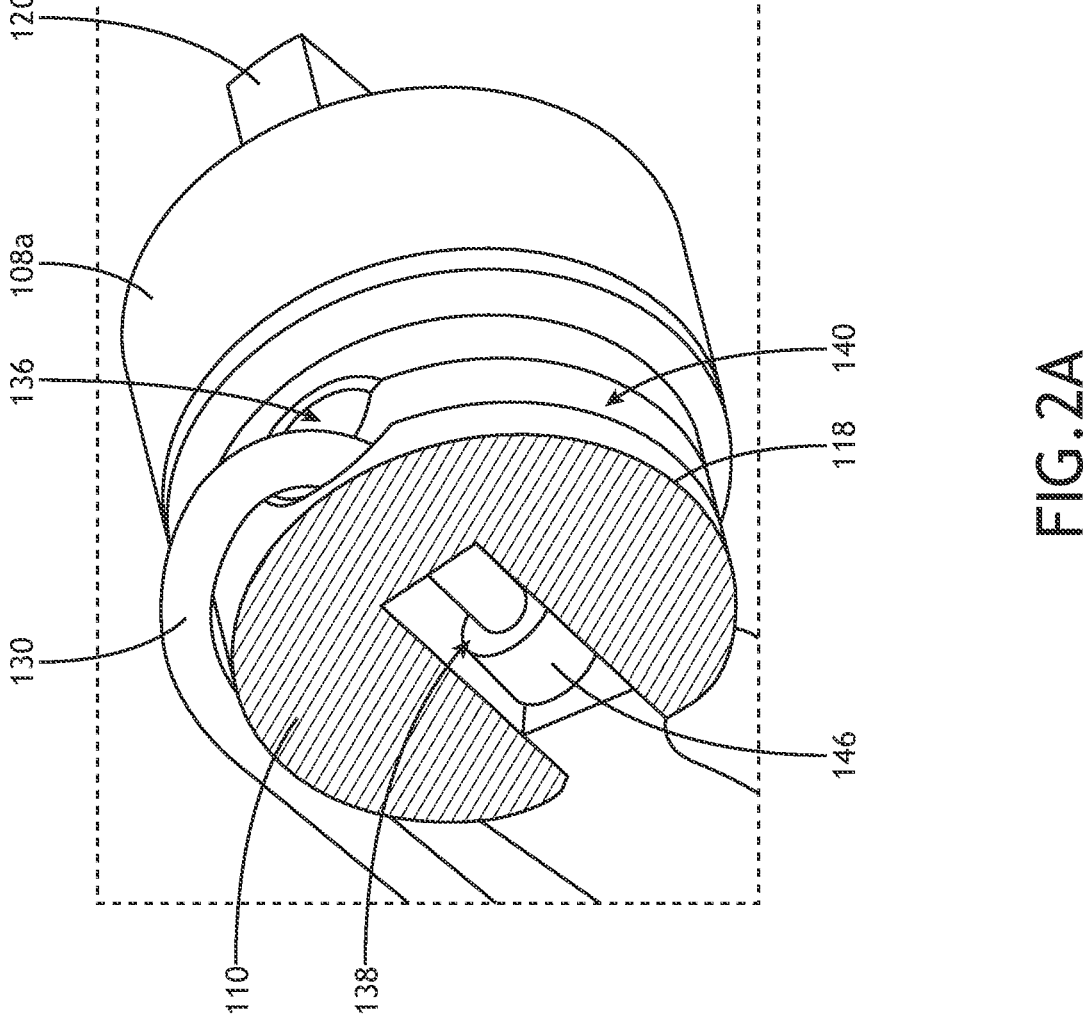
FIG. 2A is a detailed sectional view of the spindle of the mechanism showing cable attachment, in accordance with example embodiments of this disclosure.

Referring to FIG. 2A, the cable 130 winds and unwinds from the cable drum 118 of the spindle 110 as the second component, to which the spindle is attached via the spindle tabs 120, rotates between its operative positions. In embodiments, the cable drum 118 may include a radial opening 136 to a spindle pocket 138 for receiving the first end of the cable 130, and defining a circumscribing cable groove 140 in a plane transverse to rotational axis of the spindle 110. The cable 130 winds on the cable drum 118 when the spindle 110 rotates in a first direction, and unwinds from the cable drum 118 when the spring 110 rotates in a second direction opposite the first direction.

Figure 2B:
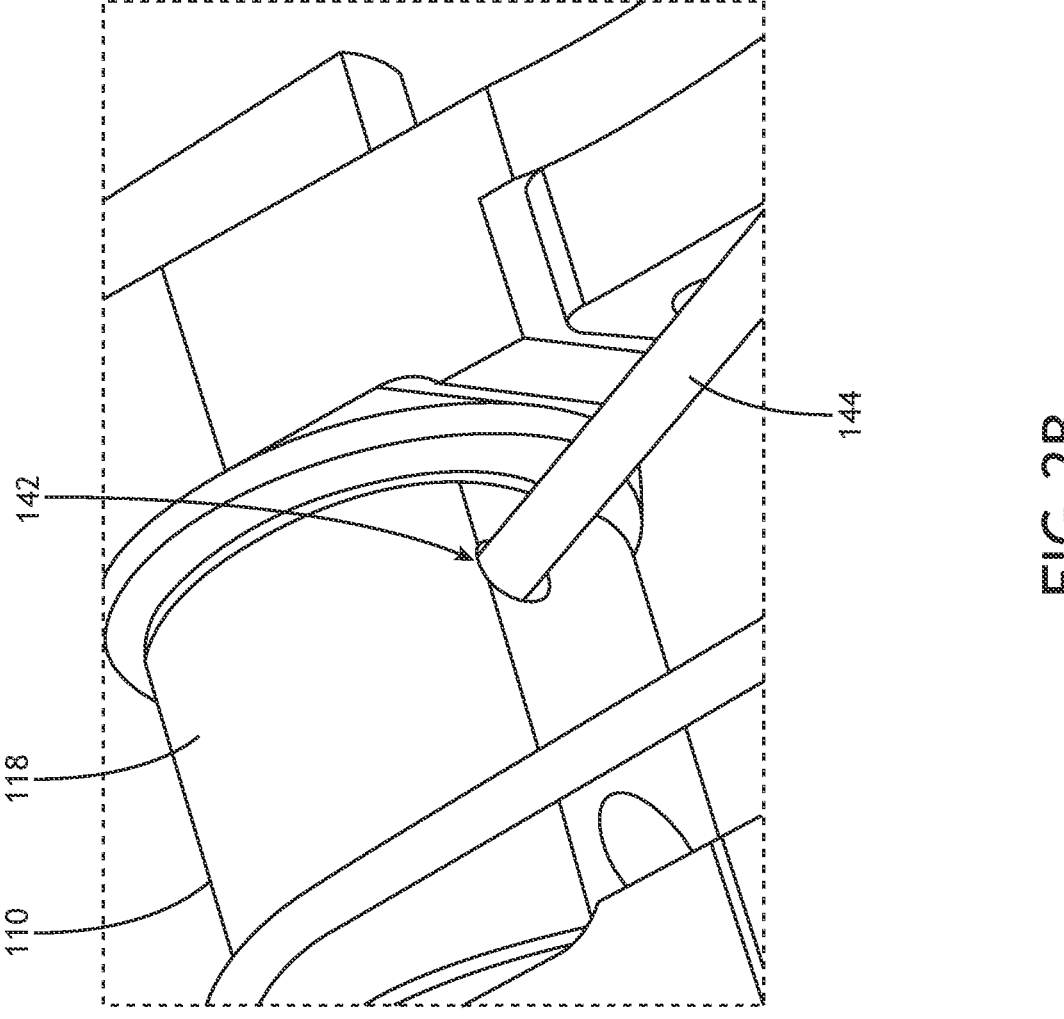
FIG. 2B is a detailed view of a lock pin for locking rotation of the spindle, in accordance with example embodiments of this disclosure.

Referring to FIG. 2B, the cable drum 110 may include a further radial opening 142 for receiving a removable spindle lock pin 144 insertable into the further radial opening 142 to anchor the spindle 110 during a preload process and assembly. Referring to FIGS. 1, 2A, and 2B, to preload the actuator mechanism 100, in a first step the cable 130 may be routed from the spring yoke 124, under the pulley 132, and wound around the spindle 110. In a second step, a cable barrel 146 positioned at the end of the cable 130 may be captured in the spindle pocket 138. In a third step, the spindle lock pin 144 is inserted into the opening 142 to orient and prevent the spindle 110 from turning during the preload process and assembly to the second component (e.g., meal table). In a fourth step, the adjustment screw 128 is turned inward to pull the spring tensioner 126 away from the yoke 124 adding tension to the cable 130. In use, the spindle lock pin 144 prevents the tangential force of the cable 130 from rotating the spindle 110, and the adjustment screw 128 is used to increase the load on the spindle 110 until a predefined force is attained. In embodiments, the force may be equated to the torque applied at the adjustment screw 128 simplifying the preload process for a technician.

Figure 3A:
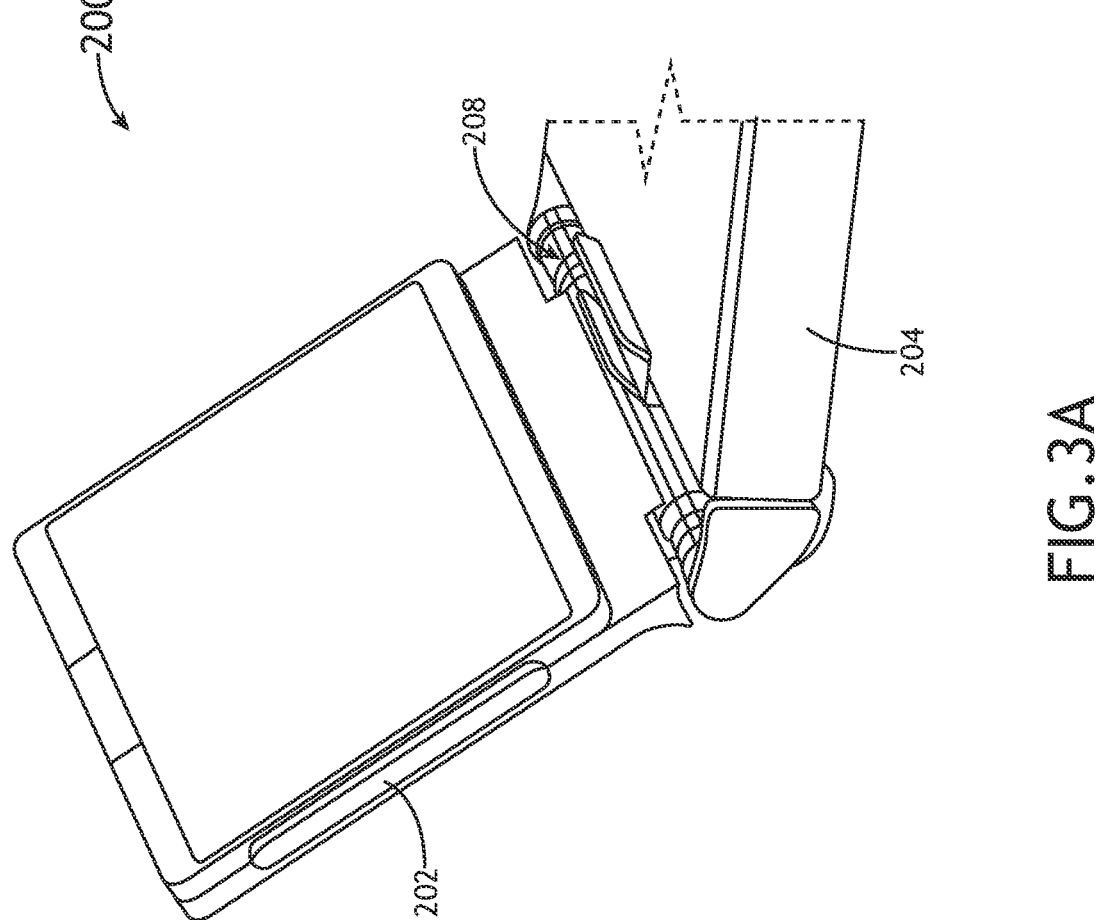
FIGS. 3A-C are sequential views illustrating various states of a meal table equipped with the actuator mechanism, in accordance with example embodiments of this disclosure.
Figure 3B:
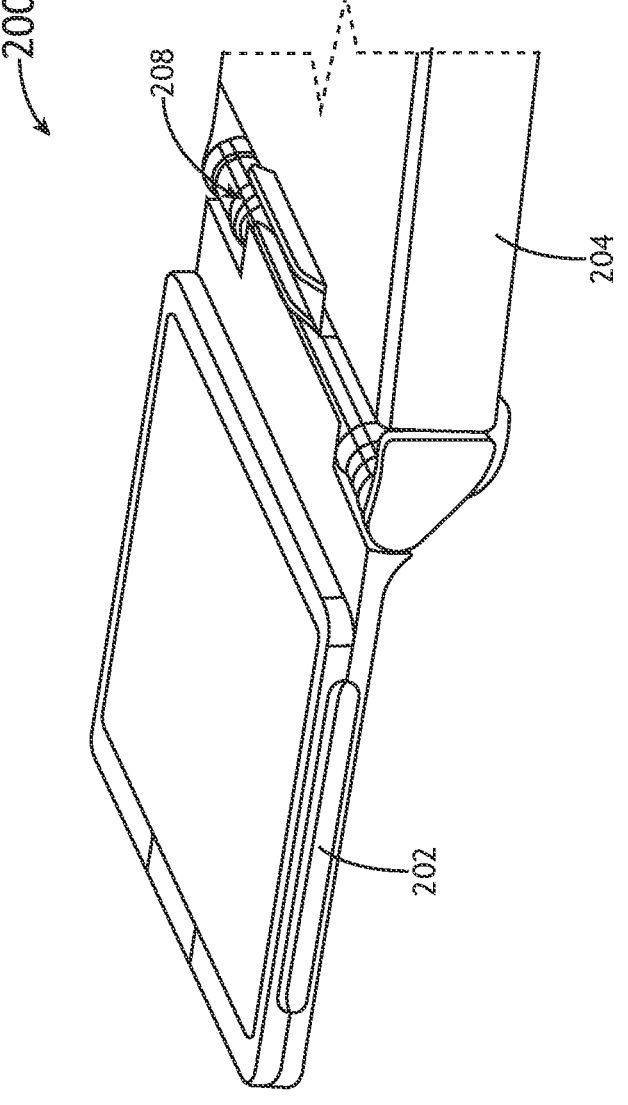
Figure 3C:
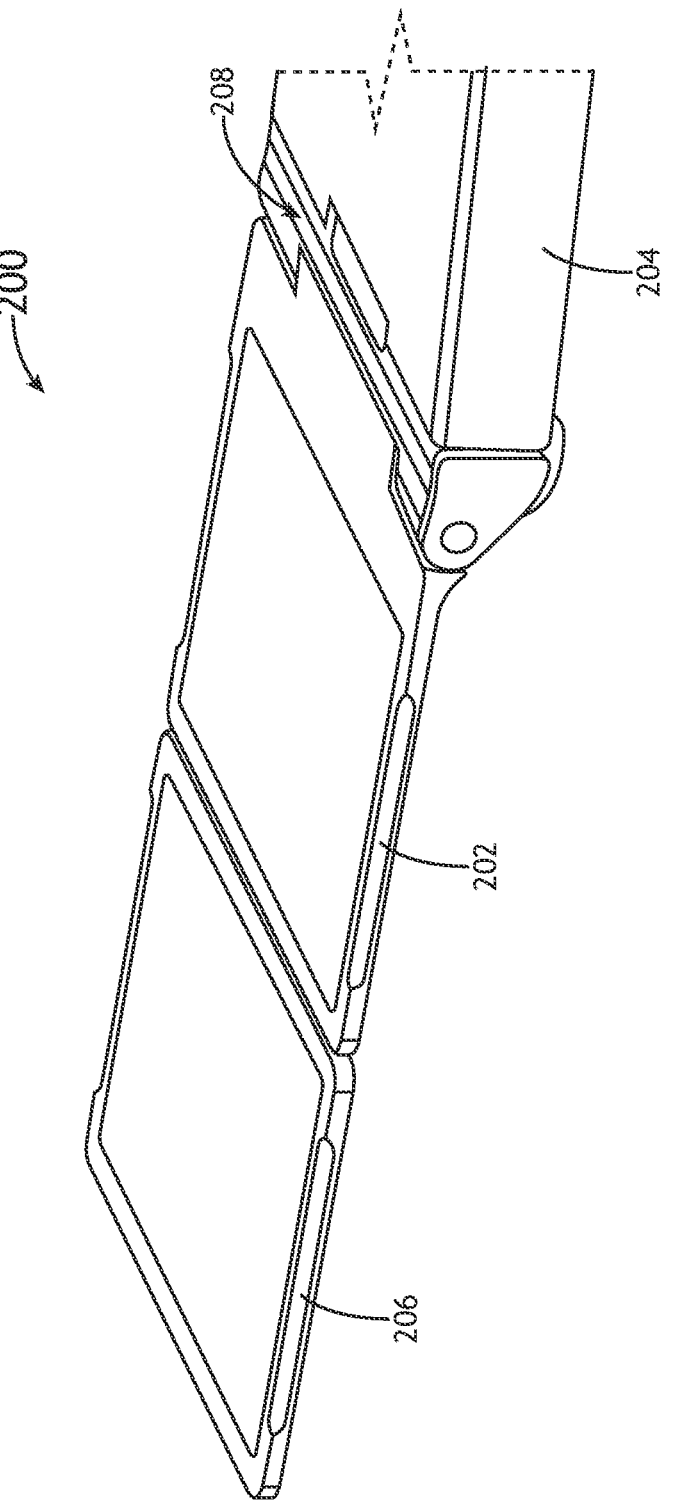

Referring to FIG. 3B, the actuator mechanism according to the above may be utilized with a meal table assembly 200 to control rotary motion of a meal table 202 relative to a meal table support 204. In embodiments, the meal table support 204 may be rotationally fixed but capable of other motions such as translation, for instance along a rail. In use, the meal table 202 may rotate between a stowed state as shown in FIG. 3A, and a deployed state as shown in FIG. 3B, for instance under manual control from a passenger. In some embodiments, the meal table 202 may be implemented as a bi-fold table including a foldable leaf 206 as shown in FIG.

30. Considering a two table part configuration, and the weight associated with two table parts, the actuator mechanism may be utilized to control rotary motion at the hinge 208 connecting the meal table 202 to the meal table support 204.

Figure 4:
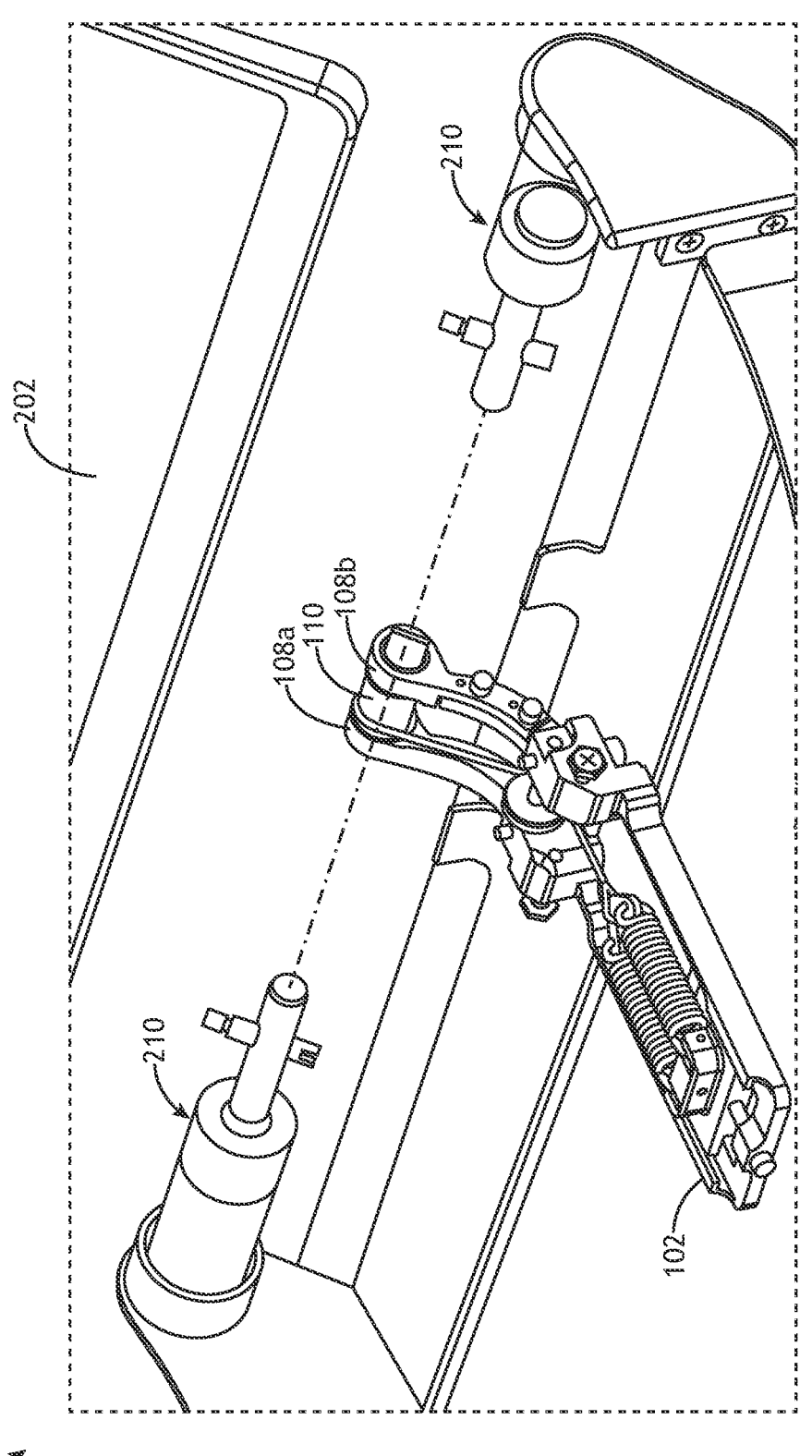
FIG. 4 is a fragmentary perspective view of a meal table assembly showing use of the actuator mechanism, in accordance with example embodiments of this disclosure.

Referring to FIG. 4 and FIG. 1, in a particular conceived example, the actuator mechanism 100 may be mounted within an interior space formed in the meal table support 204. The meal table 202 is rotatably attached to the meal table support 204 by a hinge mechanism 210 positioned at least lateral side of the meal table assembly 200. As shown, the spindle 100 is positioned coaxial with the rotational axes of the hinge mechanisms 210 to assist the rotary motion of the meal table 202. In this configuration, the base 102 is concealed within the meal table support 204 and the base is shaped as shown to position the spindle 110 elevated relative to the mounting surface to which the base 102 is mounted. As shown, a portion of the meal table 202 is interleaved between the two hinge mechanisms 210 and the spindle 110 is positioned within the meal table 202. The ends of the arms 108*a*, 108*b* are curved to allow the meal table 202 to rotate without interference between the stowed position as shown in FIG. 4, and a deployed position in which the meal table 202 is substantially horizontal.

Figure 5A:
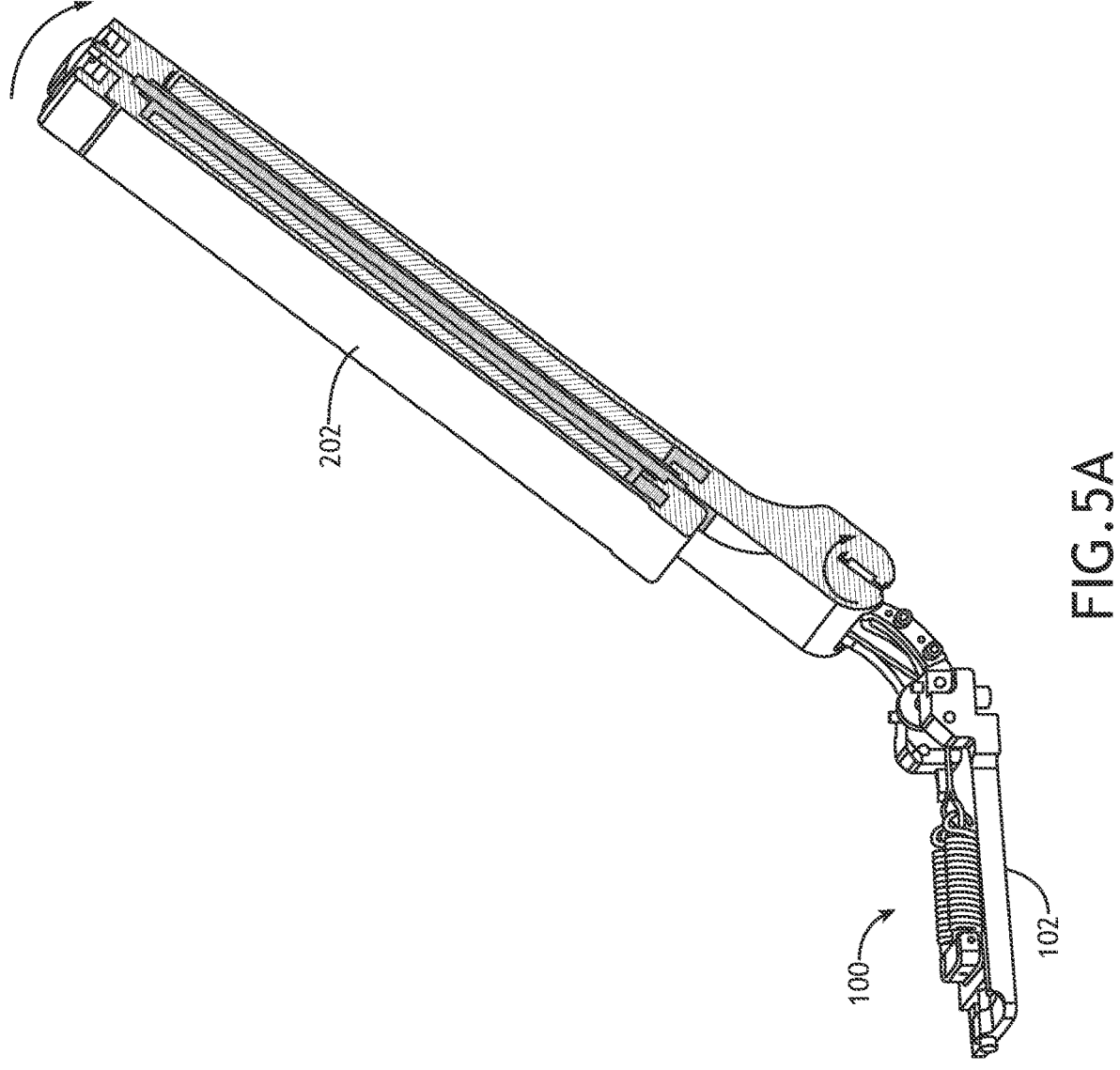
FIG. 5A is a side perspective view of the actuator mechanism showing use with a rotating meal table assembly.

Referring to FIG. 5A, the meal table 202 is shown in the stowed state, and the base 102 is shaped (e.g., curved upward) to position the spindle higher than the mounting surface of the base 102 considering, in this particular example, the fairly tall vertical profile of the meal table support in which the actuator mechanism 100 is positioned. The shape of the base 102 may thus be customized depending on assembly requiring rotation assistance. For example, the base 102 may have a more linear configuration or a steeper configuration depending on the particular application. To rotate the meal table 202 to the deployed state, the 'upper' end of the meal table 202 may be rotated downward manually by the passenger.

Figure 5B:
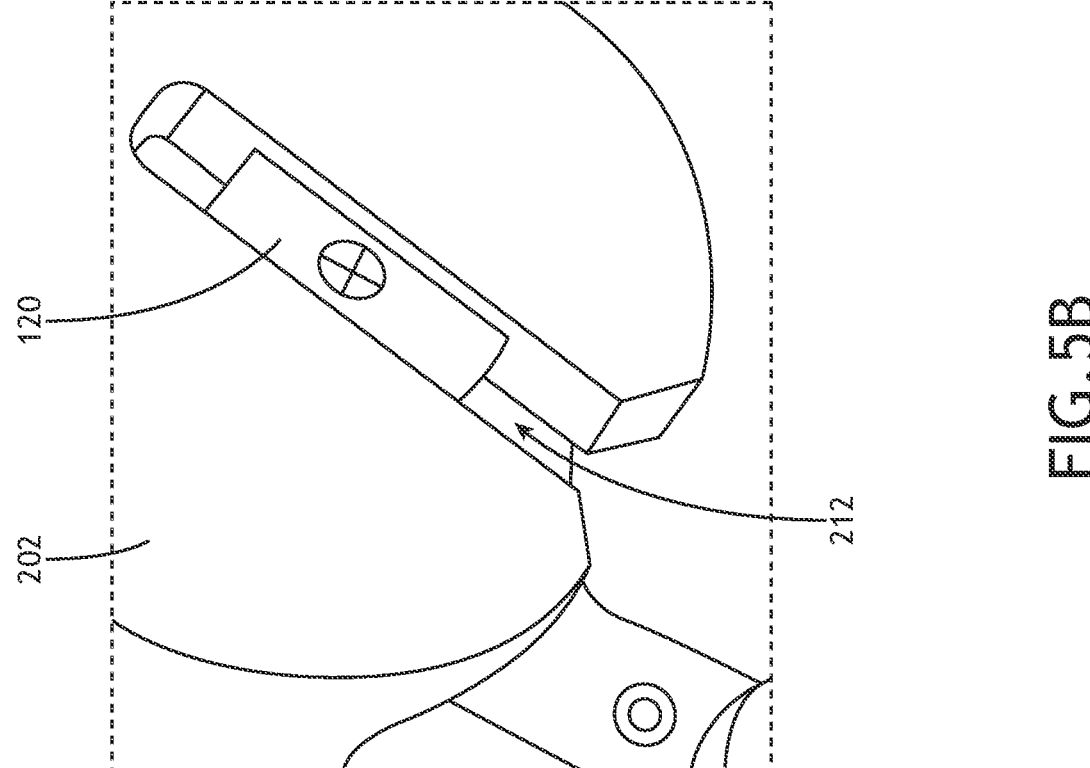
FIG. 5B is a detailed view showing the attachment interface of the spindle to a rotating meal table.

Referring to FIG. 5B and FIG. 1, the spindle tabs 120 engage in corresponding shaped slots 212 formed in the end portions of the meal table 202. The tabs 120 and the slots 212 correspond in shape to prevent relative movement therebetween such that, when the meal table 202 is rotated, the spindle 110 undergoes the same amount of rotation. As the meal table 202 is rotated 'downward' toward the deployed state, the spindle 110 rotates in a first direction (e.g., clockwise as viewed in FIG. 5B) thereby winding the cable 130 on the cable drum 118 which in turn pulls the extension springs 122*a*, 122*b* into extension (i.e., stretching the springs) to store elastic potential energy, and the resistance of the springs 122*a*, 122*b* to being stretched slows the rotational motion. Conversely, as the meal table 202 is rotated 'upward' toward the stowed state, the spindle 110 rotates in the opposite direction (e.g., counterclockwise as viewed in FIG. 5B) thereby unwinding the cable 130 from the cable drum 118 which in turn relaxes the extension springs 122*a*, 122*b* releasing their stored potential and providing lift assistance to the meal table 202. Thus, in embodiments, the actuator mechanism 100 functions as a counterbalancing mechanism.

From the above description, it is clear that the inventive concepts disclosed herein are well adapted to achieve the objectives and to attain the advantages mentioned herein as well as those inherent in the inventive concepts disclosed herein. While presently preferred embodiments of the inventive concepts disclosed herein have been described for purposes of this disclosure, it will be understood that numerous changes may be made which will readily suggest themselves to those skilled in the art and which are accomplished within the broad scope and coverage of the inventive concepts disclosed and claimed herein.

What is claimed is:

1. An actuator mechanism, comprising:
a base mountable to a first component, the base comprising a first portion and a second portion angled relative to the first portion;
a spindle rotatably mounted to the second portion of the base, the spindle attachable to a second component rotatable relative to the first component;
at least one extension spring disposed in the first portion of the base;
at least one pulley rotatably mounted at a junction of the first portion and the second portion of the base;
a cable having a first end attached to the spindle and a second end attached to the at least one extension spring, wherein the cable is routed around the at least one pulley to impart a direction change in the cable at the junction and/or to reduce required pull force; and
a spring tensioner movably mounted to the base and attached to the at least one extension spring;
wherein, in use:
the spring tensioner is movable relative to the base to tension the at least one extension spring;
rotation of the spindle in a first direction can wind the cable on the spindle thereby stretching the at least one extension spring; and
rotation of the spindle in a second direction opposite the first direction can unwind the cable from the spindle thereby relaxing the at least one extension spring.

2. The actuator mechanism according to claim 1, further comprising:
two extensions springs arranged in parallel; and
a yoke attached to the two extension springs;
wherein:
the second end of the cable is attached to the yoke; and
the spring tensioner is attached to each of the two extension springs.

3. The actuator mechanism according to claim 1, further comprising a tensioner adjustment screw received through one end of the base and threadably engaged in the spring tensioner.

4. The actuator mechanism according to claim 1, wherein one end of the base is bifurcated, and the spindle is rotatably mounted transverse at the bifurcated end.

5. The actuator mechanism according to claim 4, wherein the bifurcated end includes a detachable portion for installing and uninstalling the spindle from the bifurcated end.

6. The actuator mechanism according to claim 1, wherein opposing ends of the spindle each include a laterally-extending tab for being engaged in a slot formed in the second component to rotationally fix the spindle relative to the second component.

7. The actuator mechanism according to claim 1, wherein the spindle comprises a radial opening receiving the first end of the cable, and the spindle defines a circumscribing cable groove in a plane transverse to its rotational axis.

8. The actuator mechanism according to claim 1, wherein the at least one spring provides a spring force in a first direction, and a rotational axis of the spindle is transverse to the first direction.

9. An assembly, comprising:
a first component and a second component rotatably hinged to the first component; and an actuator mechanism for controlling rotation of the second component relative to the first component, the actuator mechanism including:

a base mounted to the first component;

a spindle rotatably mounted to the base, the spindle attached to and rotatably fixed relative to the second component;

at least one extension spring disposed in the base;

a cable having a first end attached to the spindle and a second end attached to the at least one extension spring; and a spring tensioner movably mounted to the base and attached to the at least one extension spring;

wherein, in use:

the spring tensioner is movable relative to the base to tension the at least one extension spring;

rotating the second component relative to the first component in a first direction can wind the cable on the spindle thereby stretching the at least one extension spring; and rotating the second component relative to the first components in a second direction opposite the first direction can unwind the cable from the spindle thereby relaxing the at least one extension spring.

10. The assembly according to claim 9, wherein:

the second component is rotatable relative to the first component between a stowed position and a deployed position;

the actuator mechanism can operate to slow motion of the second component as the second component moves from the stowed position to the deployed position; and the actuator mechanism can provide lift assistance for returning the second component from the deployed position to the stowed position.

11. The assembly according to claim 9, further comprising:

two extensions springs arranged in parallel; and a yoke attached to the two extension springs;

wherein:

the second end of the cable is attached to the yoke; and the spring tensioner is attached to each of the two extension springs.

12. The assembly according to claim 9, wherein:

the base comprises a first portion and a second portion angled relative to the first portion;

the at least one spring is disposed in the first portion and the spindle is rotatably mounted to the second portion;

the spindle is coaxial with a rotation axis of the second component;

the actuator mechanism further comprises at least one pulley rotatably mounted at a junction of the first portion and the second portion, the junction spaced apart from the rotation axis of the second component; and the cable is routed around the pulley to impart a direction change in the cable at the junction and/or reduce pull force.

13. The assembly according to claim 9, further comprising a tensioner adjustment screw received through one end of the base and threadably engaged in the spring tensioner.

14. The assembly according to claim 9, wherein one end of the base is bifurcated, and the spindle is rotatably mounted transverse at the bifurcated end.

15. The assembly according to claim 9, wherein opposing ends of the spindle each include a laterally-extending tab engaged in a slot formed in the second component to rotationally fix the spindle relative to the second component.

16. The assembly according to claim 9, wherein the first component is a meal table base and the second component is a meal table.

17. The assembly according to claim 9, wherein the at least one spring provides a spring force in a first direction, and a rotational axis of the spindle is transverse to the first direction.

18. An actuator mechanism, comprising:

a base mountable to a first component;

a spindle rotatably mounted to the base, the spindle attachable to a second component rotatable relative to the first component;

at least one extension spring disposed in the base;

a cable having a first end attached to the spindle and a second end attached to the at least one extension spring; and a spring tensioner movably mounted to the base and attached to the at least one extension spring;

wherein the spindle comprises a radial opening receiving the first end of the cable, and the spindle defines a circumscribing cable groove in a plane transverse to its rotational axis; and wherein, in use:

the spring tensioner is movable relative to the base to tension the at least one extension spring;

rotation of the spindle in a first direction can wind the cable on the spindle thereby stretching the at least one extension spring; and rotation of the spindle in a second direction opposite the first direction can unwind the cable from the spindle thereby relaxing the at least one extension spring.

19. The actuator mechanism according to claim 18, further comprising:

two extensions springs arranged in parallel; and a yoke attached to the two extension springs;

wherein:

the second end of the cable is attached to the yoke; and the spring tensioner is attached to each of the two extension springs.

20. The actuator mechanism according to claim 18, wherein:

the base comprises a first portion and a second portion angled relative to the first portion;

the at least one spring is disposed in the first portion and the spindle is rotatably mounted to the second portion;

the spindle is coaxial with a rotation axis of the second component;

the actuator mechanism further comprises at least one pulley rotatably mounted at a junction of the first portion and the second portion, the junction spaced apart from the rotation axis of the second component; and the cable is routed around the pulley.

* * * * *